United States Patent [19]

Heinz et al.

[11] 4,418,180

[45] Nov. 29, 1983

[54] PREPARATION OF BRANCHED BLOCK COPOLYMERS

[75] Inventors: Gerhard Heinz, Weisenheim; Burghard Schmitt, Worms; Ingo H. Dorn, Dannstadt-Schauernheim; Hermann Gausepohl, Mutterstadt; Karl Gerberding, Wachenheim; Rudolf H. Jung, Worms; Hans Mittnacht, Weinheim; Jürgen Pohrt, Mannheim; Paul Witimer, Landau, all of Fed. Rep. of Germany

[73] Assignee: BASF Aktiengesellschaft, Fed. Rep. of Germany

[21] Appl. No.: 296,849

[22] Filed: Aug. 27, 1981

[30] Foreign Application Priority Data

Aug. 30, 1980 [DE] Fed. Rep. of Germany ....... 3032832

[51] Int. Cl.$^3$ .......................................... C08F 297/04
[52] U.S. Cl. .................................................. 525/314
[58] Field of Search ......................................... 525/314

[56] References Cited

U.S. PATENT DOCUMENTS

| | | | |
|---|---|---|---|
| 3,465,065 | 9/1969 | Moss et al. | 60/879 |
| 3,639,517 | 2/1972 | Kitchen | 525/122 |
| 4,051,197 | 9/1977 | Fodor | 525/314 |
| 4,080,407 | 3/1978 | Fodor | 525/314 |
| 4,086,298 | 4/1978 | Fahrbach et al. | 525/314 |
| 4,167,545 | 9/1979 | Fahrbach et al. | 525/314 |
| 4,232,137 | 11/1980 | Irvin et al. | 526/71 |
| 4,248,981 | 2/1981 | Milkorich | 525/314 |
| 4,248,982 | 2/1981 | Bi | 525/314 |

*Primary Examiner*—Paul R. Michl
*Attorney, Agent, or Firm*—Keil & Witherspoon

[57] ABSTRACT

A process for the preparation of branched block copolymers of from 60 to 95% by weight of a monovinyl-aromatic monomer and from 40 to 5% by weight of a conjugated diene by polymerizing the monomers in an inert solvent in the presence of a monolithium-hydrocarbon as the initiator, wherein, in a first process stage (a), from 50 to 80, or where necessary at most 90, % by weight of the total amount of monovinyl-aromatic compound are polymerized to virtually complete conversion in the presence of a relatively small amount of the monolithium-hydrocarbon. This stage is carried out by starting with from 30 to 70% by weight of the vinyl-aromatic monomer and adding from 70 to 30% by weight in the feed, during the polymerization, in such a way that the polymerization temperature, which at the start of the polymerization is from 30° to 40° C., is kept at from 45° to 70° C., with use of reflux cooling. After all the monomer feed has been added, the reaction temperature is lowered to 30°–40° C. by evaporative cooling. In a second process stage (b), an additional amount of initiator is added to the reaction solution, after which from 1 to 30% by weight of the total amount of monovinyl-aromatic monomer can be added, the sum of the amounts of monovinyl-aromatic monomer added in the first and second process stages being at most 90% by weight of the total amount of monovinyl-aromatic monomer. The monovinyl-aromatic monomer added in the second process stage is polymerized to virtually complete conversion, employing the temperature profile described for stage (a). In process stage (c), the remainder of the monovinyl-aromatic monomer and all of the conjugated diene are added, at least predominantly in the form of a mixture, and polymerized so that the reaction temperature does not rise above 90°–110° C. Finally, after virtually complete conversion of the monomers, and preferably without prior cooling, a suitable liquid polyfunctional coupling agent is run in undiluted and the mixture of the linear block copolymers obtained, which still contain active terminal lithium-carbon bonds, is coupled, with stirring, to form branched block copolymers. The products prepared according to the invention are used for injection molding.

1 Claim, No Drawings

PREPARATION OF BRANCHED BLOCK COPOLYMERS

The present invention relates to a process for the preparation of branched block copolymers of from 60 to 95% by weight of a monovinyl-aromatic monomer and from 40 to 5% by weight of a conjugated diene by polymerizing the monomers in an inert solvent in the presence of a monolithium-hydrocarbon as the initiator, with stepwise addition of monomer and initiator and subsequent coupling of the resulting living linear block copolymers with a polyfunctional coupling agent.

The relevant prior art includes (1) U.S. Pat. No. 4,086,298 and (2) U.S. Pat. No. 4,167,545.

(1) and (2) disclose the preparation of branched block copolymers having a polymodal distribution. The products obtained by the known processes have greater transparency and better mechanical properties than pure polystyrene or mixtures of polystyrene with linear block copolymers. In particular, they are superior in respect of impact strength and yield stress to the products known from German Laid-Open Application DOS No. 1,959,922.

It is an object of the present invention to improve the transparency and impact strength of the products known from (1) and (2). Both properties are adversely affected by chain termination reactions during polymerization, which lead to homopolystyrene and to non-coupled two-block copolymers. The chain termination has a particularly adverse effect on the transparency of mixtures of standard polystyrene and products obtained according to (1) or (2).

We have found that this object is achieved by the measures set out in the characterizing clause of claim 1.

By employing the temperature profile described in the characterizing clause of claim 1, the proportion of homopolystyrene can be substantially reduced and the coupling yield increased. The use of undiluted coupling agent moreover further increases the coupling yield and accordingly further improves the impact strength. Accordingly, the products prepared by the process according to the invention show improved processing stability and heat resistance. The processing range is broadened and the upper limit, for preservation of transparency, of the molecular weight of polystyrene which can be used as a component in the mixture is raised. Furthermore, finished articles show no clouding on annealing. The surface quality of extruded sheet can be further improved by admixture of lubricants.

Examples of monovinyl-aromatic monomers suitable for the process according to the invention are styrene, sidechain-alkylated styrenes, e.g. α-methylstyrene, and nuclear-substituted styrenes, e.g. vinyltoluene and ethylvinylbenzene. The monovinyl-aromatic monomers can be employed individually or as a mixture with one another. Preferably, styrene, by itself, is employed.

Examples of conjugated dienes which can be employed, individually or as mixtures with one another, in the process according to the invention for the preparation of the branched block copolymers are butadiene, isoprene and 2,3-dimethylbutadiene. Butadiene and isoprene are particularly preferred, and of these two, in turn, butadiene is preferred.

The branched block copolymers prepared by the process according to the invention should in total contain, as copolymerized units, from 60 to 95% by weight, especially from 70 to 90% by weight, of the monovinyl-aromatic monomer and from 40 to 5% by weight, preferably from 30 to 10% by weight, of a conjugated diene, in each case based on the total monomers employed. The molecular weight of the branched block copolymer should as a rule be from 100,000 to 1,000,000 and is preferably from 150,000 to 500,000.

The process according to the invention is carried out by successive polymerization of the monomer solution in the presence of a monolithium-hydrocarbon initiator and with stepwise addition of monomer and initiator, the resulting living block copolymers being subsequently coupled by means of a polyfunctional, reactive compound. Accordingly the method is as follows:

In a first process stage (a), a non-elastomeric polymer segment is first produced, in which a substantial proportion of the total amount of the monovinyl-aromatic monomer is polymerized by means of a relatively small amount of the monolithium-hydrocarbon initiator in an inert solvent under the conditions which will be described below.

From 50 to 80, or if necessary up to 90, % by weight of the total amount of monovinyl-aromatic monomer is used. In process stage (a), from 0.1to 10 millimoles of lithium catalyst/mole of the monovinyl-aromatic monomer employed in the first process stage are used.

The initiator used is a conventional monolithium-hydrocarbon of the general formula RLi, where R is an aliphatic, cycloaliphatic, aromatic or aliphatic-aromatic hydrocarbon radical. Preferably, monolithium-alkyl compounds, where alkyl is of 2 to 6 carbon atoms, are employed, n-butyl-lithium and sec.-butyl-lithium being particularly preferred.

Suitable hydrocarbon solvents are aliphatic, cycloaliphatic or aromatic hydrocarbons which are liquid under the reaction conditions and which preferably are of 4 to 12 carbon atoms. Specific examples are isobutane, n-pentane, isooctane, cyclopentane, cyclohexane, cycloheptane, benzene, toluene and xylene. Mixtures of these solvents can also be employed. Furthermore, it is possible to carry out the polymerization in the presence of small amounts of ethers, such as tetrahydrofuran, in order to influence, in a conventional manner, the polymerization rate, the configuration of the butadiene polymer segments and the transition between the segments of the different monomers. Preferably, however, the reaction is carried out without addition of ether. The concentration of the monomers in the reaction solution is not critical and can be adjusted so that any desired polymerization apparatus can be employed. Usually, the polymerization is carried out in a 10–30% strength solution in the inert solvents.

The polymerization is carried out under the conventional conditions for anionic polymerization with lithium-organic compounds, such as the presence of an inert gas atmosphere, and exclusion of moisture. To establish anhydrous conditions, any moisture present is first titrated with lithium-organic compounds.

It is essential in carrying out process stage (a) to observe a certain temperature profile over the period up to the second addition of initiator. This can be achieved, for example, by starting the polymerization at a certain temperature, in the range of from 30° to 40° C., and removing the heat of reaction generated, using evaporative cooling and at the same time introducing monomer through the feed, the temperature being kept below 80° C. and in particular at from 45° to 70° C. A skilled worker can readily calculate, from the heat of reaction to be expected, the ratio of vinyl-aromatic monomer respectively to be used in the initial charge and in the feed in process stage (a). If the polymerization is started at 30°–40° C., it is possible, for example, to employ from 30 to 70% by weight of the total vinyl-aromatic monomer to be reacted in process stage (a) as the initial charge, whilst the remainder, namely from 70 to 30% by weight, can be added during the polymerization in process stage (a). It is particularly preferred to regulate the feed of monomer, under given conditions of reflux cooling, to maintain a temperature of from 45° to 70° C.

After completion of the addition of the vinyl-aromatic monomer the polymerization temperature is next lowered, by evaporative cooling, to from 30° to 40° C., before the second addition of initiator is made. This lowering of the temperature is a precondition for carrying out process stage (b) or, if the latter is omitted, carrying out the subsequent process stage (c).

The polymerization in the first process stage (a) is taken to virtually complete conversion of the monovinyl-aromatic monomer employed. This gives a solution of non-elastomeric, living polymer of the monovinyl-aromatic monomer, ie. polymer segments with active terminal lithium-carbon bonds, which are capable of further addition reaction with monomer.

In the second process stage (b)—if such a stage is carried out—a further amount of fresh initiator is added to the solution obtained in process stage (a). This amount should be as great, or greater, than the original amount of initiator employed in the first process stage (a) of the polymerization. Preferably, the additional amount of initiator added in the second process stage is from 1 to 15, and especially from 1 to 10, times as great as the amount of initiator originally employed.

In this process stage, after addition of the initiator, it is possible to add, if necessary, from 1 to 30% by weight, preferably from 5 to 20% by weight, of the total amount of the monovinyl-aromatic monomer used for the process according to the invention. The sum of the amounts of monovinyl-aromatic monomer employed in the first stage and, where relevant, in the second stage should however be at most 90% by weight of the total amount of the monovinyl-aromatic monomer. If a further amount of monovinyl-aromatic compound is added in the second process stage, a temperature profile is maintained, in the manner described above [cf. process stage (a)], by reflux cooling and by dividing the calculated amount of monomer appropriately between the initial charge and the feed. Accordingly, in process stage (b) the same conditions in respect of heat removal are employed as in process stage (a). At the end of process stage (b), the polymerization temperature is again lowered to a value within the range of from 30° to 40° C. by employing reflux cooling. (If, however, after addition of initiator in process stage (b), no additional amount of vinyl-aromatic monomer is added, the process stage described under (c) below can follow immediately). In process stage (b), as in the first process stage (a), the polymerization is taken to virtually complete conversion of the monovinyl-aromatic monomer added. This has the effect that in addition to the chains resulting from addition to polymer segments formed in the first process stage, new chains of living polymers are also formed (polymodal synthesis).

In a further processing stage (c), polymer segments containing diene are polymerized onto the active chain ends. During the polymerization of the total amount of the conjugated diene plus any residual monovinyl-aromatic monomer still present, the temperature should not exceed 110° C. The heat of polymerization is generated within a brief period, so that suitable measures must be taken to prevent this limit of 110° C. from being exceeded. Preferably, the temperature at the end of the last process stage (before the coupling is carried out) is from 90° to 110° C. One measure of ensuring this is to lower the temperature sufficiently, by employing reflux cooling in stages (b) and/or (a), before starting stage (c). Another possible measure is to add part of the diene, especially butadiene, in the feed, and then to add the remaining monomers, i.e diene and vinyl-aromatic monomer, as a mixture, all at once, to the reaction batch. To achieve the desired structure, it is necessary that the predominant proportion of the monomers to be polymerized onto the chains in process stage (c) is added direct, as a mixture of diene and vinyl-aromatic monomer, to the polymerization batch. In process stage (c), the total amount of conjugated diene, ie. from 5 to 40% by weight of the total monomers employed, is used. The amount of vinyl-aromatic monomer used in this stage depends somewhat on how much of the monomer has been used in process stage (b), if such a stage has been operated.

After completion of polymerization of the monomers or monomer mixture in the last process stage (c), the reaction solution contains a mixture of living linear block copolymers having reactive lithium-styryl carbon bonds.

The mixture of these living, linear block copolymers is then reacted, in a further process step, in the presence of a polyfunctional reactive compound as a coupling agent. For the process according to the invention, the coupling agent must be at least trifunctional. Examples include polyepoxides, such as epoxidized linseed oil, polyisocyanates, for example benzene-1,2,4-triisocyanate, cyclic anhydrides, such as maleic anhydride, polyketones and polyhalides. Dicarboxylic acid esters, for example diethyl adipate or the like, can also be used as coupling agents. The silicon polyhalides are a further group of suitable coupling agents. Further, polyfunctional coupling agents based on divinylbenzene can be employed. Epoxidized linseed oil is particularly preferred as the coupling agent.

The coupling of the living linear block copolymer with the polyfunctional coupling agent is carried out within a narrow temperature range, namely at from 90° to 110° C. It is necessary not to exceed the stated upper limit, since otherwise the yield diminishes. Liquid coupling agents which are not less than trifunctional and can be dosed as liquids under the coupling conditions are particularly preferred. We have found, surprisingly, that adding the coupling agent in undiluted form, with stirring, leads to an increase in yield. Accordingly, the process according to the invention is preferably carried with addition of the liquid coupling agent tel quel. Following the coupling reaction, but advantageously before isolating the star-branched polymer from the reaction solution, the polymer (mixture) can, if desired, be selectively or completely hydrogenated, in a manner known to a skilled worker.

The branched block copolymer is isolated from the reaction solution in a conventional manner, for example by precipitating and filtering off.

The products prepared by the process according to the invention can be directly processed by conventional thermoplastic processing methods, ie. by, for example, extrusion, injection molding, calendering, blow-molding, compression-molding or sintering. The production of injection moldings and of packaging materials is particularly preferred. To produce these moldings and packaging materials, the products obtained by the process according to the invention are preferably mixed with other thermoplastics, especially with standard polystyrene, in the proportions familiar to a skilled worker. We have found that the products prepared by the process according to the invention can be compounded with polystyrenes of higher molecular weight than has been disclosed to be the case for prior art products (cf. (1) or (2)). Surprisingly, even finished articles made from such mixtures show no clouding on annealing. If desired, conventional additives can be introduced into the products, obtained according to the invention, before or during processing. The same is true of the preparation of blends with other thermoplastics.

Suitable additives include stabilizers, fillers, colored pigments, external lubricants, plasticizers, antistatic agents and blowing agents, which are employed in the conventional amounts known to a skilled worker. To improve the surface quality of extruded films, external lubricants used are, for example, octadecyl alcohol, butyl stearate, microcrystalline wax or Acrawax.

The parameters described in the Examples and Comparative Experiments were measured as follows:

1. The intrinsic viscosity, measured in 0.5% strength by weight solution in toluene at 25° C., is shown as a measure of the molecular weight, more precisely of the weight-average molecular weight, of the block copolymers.
2. The damaging energy in [N.m] was determined according to DIN 53,453 on an injection molding.
3. The impact strength, $a_n$, in $kJ/m^2$, was determined according to DIN 53,413.

The invention is illustrated below by an Example and Comparative Experiments. All parts and percentages quoted therein are by weight, unless stated otherwise.

EXAMPLE AND COMPARATIVE EXPERIMENTS

The experiments described below were carried out in a polymerization kettle of 1.5 m³ capacity, and using a total amount of 200 kg of monomers. Cyclohexane was used as the solvent in every case. The solids concentration after completion of polymerization was 25%. The coupling agent used was epoxidized linseed oil in every case. When working up the reaction product, 1.5 parts of trinonyl phosphite, as a stabilizer, and 0.5 part of tert.-butyl-phenol were added.

COMPARATIVE EXPERIMENT A

Example 1 of prior art (1) was carried out in a pressure reactor of 6 liters capacity.

Repeating this Example, in a polymerization kettle of 1.5 m³ capacity, without special measures for removing heat, gave a temperature of 90° C. after the first polymerization stage, and 120° C. at the end of the second stage. After cooling the mixture to 90° C. by jacket cooling, the coupling agent was added, as a 10% strength solution in toluene, in a single shot. The intrinsic viscosity of the reaction product was found to be 75.6 cm³/g. The mechanical properties are shown in the Table, together with values obtained from the other experiments, as a function of the injection molding temperature. The column headed "Homopolystyrene" in the Table furthermore shows the content of homopolystyrene, in % by weight, formed by chain termination reactions. This proportion is based on the total product and was determined by selective extraction with a mixture of methyl ethyl ketone and acetone.

COMPARATIVE EXPERIMENT B

Example 1 of German Published Application DAS No. 1,959,922 was repeated. According to the statements of the applicant, Example 1 was probably carried out in an autoclave of about 15 liters capacity. On repeating this Example in the polymerization kettle of 1.5 m³ capacity, the final temperature was found to be 96° C. at the end of the first process stage, 85° C. at the end of the second stage and 125° C. at the end of the third stage. Before adding the diluted coupling agent, the batch was cooled to 85° by jacket cooling. The intrinsic viscosity of the polymer obtained was 78.2 cm³/g.

EXAMPLE 1

This Example describes the process according to the invention without addition of vinyl-aromatic monomer in process stage (b).

In a polymerization kettle of 1.5 m³ capacity, equipped with a reflux condenser, 600 kg of cyclohexane and 60 kg of styrene were titrated with n-butyl-lithium at 35° C., under an inert gas atmosphere and with exclusion of moisture, until polymerization commenced. 2.0 moles of sec.-butyl-lithium, as a solution in cyclohexane, were then added. As a result of the polymerization starting, the internal temperature rose to 59° C. 40 kg of styrene were then run in at 60° C. in the course of 15 minutes, with operation of reduced pressure evaporative cooling. After completion of the polymerization, the mixture was further cooled to about 40° C. by reduced pressure evaporative cooling. After addition of a further 2.26 moles of sec.-butyl-lithium and a mixture of 50 kg of styrene and 50 kg of butadiene, the internal temperature rose to 98° C. in the course of 20 minutes. Immediately after the maximum temperature had been reached, 560 g of epoxidized linseed oil, in the liquid state, were introduced in the course of 10 minutes, with stirring, and the reaction solution was then cooled to room temperature, mixed with stabilizer and worked up. The intrinsic viscosity of the product obtained was found to be 78.5 cm³/g.

COMPARATIVE EXPERIMENT C

Experiment C was carried out similarly to Example 1, but the coupling agent was only added (as a 10% strength solution in toluene) after cooling the polymerization solution to 70° C. The intrinsic viscosity of the product obtained was 73.1 cm³/g.

The Table shows that the products obtained by the process according to the invention exhibit a better pattern of properties.

TABLE

| Comparative Experiment | Example | Homopolystyrene [%] | Injection molding temperature | Damaging energy N/m | Impact strength KJ/M² |
|---|---|---|---|---|---|
| A | — | 14.7 | 200 | 13.5 | 26.4 |
|  |  |  | 220 | 13.5 | 18.9 |
|  |  |  | 240 | 12.6 | 15.2 |
|  |  |  | 260 | 11.5 | 11.5 |
|  |  |  | 280 | 11.2 | 8.7 |
| — | 1 | 5.9 | 200 | 27.8 | no fracture |
|  |  |  | 220 | 24.5 | 24.3 |
|  |  |  | 240 | 32.4 | 18.9 |
|  |  |  | 260 | 32.4 | 14.6 |
|  |  |  | 280 | 28.9 | 13.3 |

TABLE-continued

| Comparative Experiment | Example | Homopoly-Styrene [%] | Injection molding temperature | Damaging energy N/m | Impact strength KJ/M² |
|---|---|---|---|---|---|
| B | — | 16.8 | 200 | 13.0 | 24.1 |
|   |   |      | 220 | 13.5 | 18.1 |
|   |   |      | 240 | 14.3 | 13.4 |
|   |   |      | 260 | 14.6 | 10.1 |
|   |   |      | 280 | 12.9 | 9.3 |
| C | — | 6.5  | 200 | 11.8 | 19.7 |
|   |   |      | 220 | 11.6 | 16.4 |
|   |   |      | 240 | 11.7 | 12.0 |
|   |   |      | 260 | 11.6 | 11.8 |
|   |   |      | 280 | 5.9  | 7.6 |

We claim:

1. A process for the preparation of branched block copolymers of from 60 to 95% by weight of a monovinyl-aromatic monomer and from 40 to 5% by weight of a conjugated diene of 4 to 8 carbon atoms by polymerizing the monomers in an inert solvent in the presence of a monolithium-hydrocarbon as the initiator, wherein, in a first process stage (a), from 50 to 80, or where necessary at most 90, % by weight of the total amount of monovinyl-aromatic compound are polymerized to virtually complete conversion in the presence of a relatively small amount of the monolithium-hydrocarbon, and thereafter, in a second process stage (b), an additional amount of initiator, which may be equal to or greater than the originally employed amount of initiator, is added to the reaction solution, after which a further 1-30% by weight of the total amount of monovinyl-aromatic monomer can be added, the sum of the amounts of monovinyl-aromatic monomer added in the first and second process stages being at most 90% by weight of the total amount of monovinyl-aromatic monomer, and any such monovinyl-aromatic monomer added in the second process stage is polymerized to virtually complete conversion, after which, in a further process stage (c), the remainder of the monovinyl-aromatic monomer and all of the conjugated diene are added, at least predominantly in the form of a mixture, and are polymerized, and finally, after virtually complete conversion of the monomers, the mixture of the resulting linear block copolymers, having active terminal lithium-carbon bonds, is subjected to coupling by addition of a polyfunctional coupling agent, with stirring, to form branched block copolymers, in which process 30-70% by weight of the total amount of vinyl-aromatic monomer to be reacted in process stage (a) is initially taken and 70-30% by weight is added, in the feed, during the polymerization in such a way that the polymerization temperature, which at the start of the polymerization is from 30° to 40° C., is kept at from 45° to 70° C., with use of reflux cooling, during stage (a), after completion of the monomer feed the reaction temperature is lowered to 30°-40° C. by evaporative cooling before fresh initiator is added in order to carry out stage (b) or (c), if stage (b) is carried out, the same temperature profile as for stage (a) is employed, and furthermore the polymerization of the remaining vinyl-aromatic monomer and the conjugated diene in stage (c) is carried out in such as way that the reaction temperature does not rise above 90°-110° C., and finally, after completion of the polymerization, and preferably without prior cooling, a suitable liquid coupling agent is run undiluted into the reaction mixture.

* * * * *